US 6,322,431 B1

(12) United States Patent
Schaenzer et al.

(10) Patent No.: US 6,322,431 B1
(45) Date of Patent: Nov. 27, 2001

(54) BURNISH HEAD WITH ION MILLED AERODYNAMIC PADS CONFIGURED IN AN ELLIPTICAL PATTERN

(75) Inventors: Mark James Schaenzer, Eagan; William Omar Liners, Minnetonka; Daniel Paul Burbank, Minneapolis, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/416,739

(22) Filed: Oct. 13, 1999

Related U.S. Application Data (60) Provisional application No. 60/104,307, filed on Oct. 13, 1998.

(51) Int. Cl.$^7$ .................................................. B24B 5/00
(52) U.S. Cl. ............................................ 451/317; 451/290
(58) Field of Search ........................... 451/317, 63, 103, 451/318, 901, 312, 324, 552, 555, 557, 558, 290, 146, 183, 258, 246, 254, 548, 28; 29/90.01

(56) References Cited

U.S. PATENT DOCUMENTS

| | | | |
|---|---|---|---|
| 4,845,816 | 7/1989 | Nanis | 29/90.01 |
| 5,063,712 | 11/1991 | Hamilton et al. | 51/67 |
| 5,067,037 | 11/1991 | Ananth et al. | 360/103 |
| 5,200,867 | 4/1993 | Albrecht et al. | 360/234.1 |
| 5,267,104 | 11/1993 | Albrecht et al. | 360/103 |
| 5,431,592 | 7/1995 | Nakata | 451/63 |
| 5,658,191 | 8/1997 | Brezoczky | 451/324 |
| 5,659,447 | 8/1997 | Gregory et al. | 360/103 |
| 5,708,540 | 1/1998 | Ananth et al. | 360/103 |
| 5,782,680 * | 7/1998 | Pilsan | 451/317 |
| 5,825,181 | 10/1998 | Schaenzer et al. | 360/103 |
| 5,841,608 | 11/1998 | Kasamatsu et al. | 360/103 |
| 5,980,369 * | 11/1999 | Burga et al. | 451/317 |
| 6,003,364 | 12/1999 | Yao et al. | 73/105 |
| 6,040,958 | 3/2000 | Yamamoto et al. | 360/236.3 |
| 6,230,380 | 5/2001 | Wang et al. | 29/90.01 |

OTHER PUBLICATIONS

U.S. application No. 09/873,710, Ekstrum et al., filed Jun. 4, 2001.

* cited by examiner

Primary Examiner—Derris H. Banks
(74) Attorney, Agent, or Firm—Westman, Champlin & Kelly, P.A.

(57) ABSTRACT

A burnishing head configured to provide extremely close control of the burnishing height, to aerodynamically eject particles generated by the burnishing process from beneath the burnishing head onto the disc surface, whence they can be swept from the disc by centripetal force, and to optimize the tribological relationship between the burnishing head and a disc being burnished. The burnishing head includes a plurality of burnishing pads arranged in an elliptical pattern, with the actual burnishing surface of the burnishing pads being either ion milled to provide a closely controlled surface texture, or lapped to a extremely smooth surface. The shape of the individual burnishing pads is also formed by the process of ion milling, and is either elliptical, or, preferably, an aerodynamic teardrop shape, which acts to aerodynamically displace generated particles from beneath the burnishing head. The burnishing surface of the burnishing pads is coated with a diamond-like coating to improve the tribological relationship between the burnishing head and the disc.

30 Claims, 12 Drawing Sheets

BURNISH HEAD WITH ION MILLED AERODYNAMIC PADS CONFIGURED IN AN ELLIPTICAL PATTERN

CROSS-REFERENCE TO RELATED APPLICATION

This Application claims the benefit of United States Provisional Application Ser. No. 60/104,307, filed Oct. 13, 1998.

BACKGROUND OF THE INVENTION

This invention relates generally to the field of rigid disc drive, and more particularly, but not by way of limitation, to an improved burnish head, which can be utilized to facilitate manufacture of rigid magnetic recording media with extremely smooth surface characteristics.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, 12 $\mu$") or greater, the surface characteristics of the discs were adequate for the times.

Disc drives of the current generation incorporate heads that fly at nominal heights of only about 1.0 $\mu$", and products currently under development will reduce this flying height to 0.5 $\mu$" or less. Obviously, with nominal flying heights in this range, the surface characteristics of the disc medium must be much more closely controlled than was the case only a short time ago.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs a precision spin stand and a specially configured glide test head including a piezo-electric sensing element, usually comprised of lead-zirconium-titanate ($PbZrTi_3$), also commonly known as a "pzt glide test head". The glide test is performed with the pzt glide test head flown at approximately half the flying height at which the operational read/write head will fly in the finished disc drive product. For instance, if the disc being glide tested is intended for inclusion in a disc drive in which the operational heads will fly at 1.0 $\mu$", the glide test will typically be performed with the pzt glide test head flying at 0.5 μ". If the glide test is completed without sensing any surface defects, then the disc is passed on the assumption that there will be no adverse effects on the operational heads and the discs during normal operation with a nominal head flying height twice that of the pzt glide test head flying height.

If, however, surface asperities or defects exist on the surface of the disc under test, the passage of the glide test head over the surface asperity will result in excitation of the glide test head, due to either direct contact between the pzt glide test head and the surface defect, or the disruption of the nominal hydrodynamic relationship between the rotating disc and the pzt test head. Current glide test head technology allows for the detection of media surface defects in the sub-microinch range.

When surface defects are detected on a disc, the disc is subjected to an additional manufacturing step called "burnishing". Burnishing is accomplished through the use of specially configured burnishing heads. The burnishing head is engaged with a rotating disc and contact between the burnishing head and surface defects results in mechanical removal of the surface defects. Following the burnishing process, the glide test is again performed. Current economic considerations dictate that any given disc will be subjected to the burnishing and glide test processes only a limited number of times, such as twice, before—with the continuing presence of surface defects—being finally rejected.

With the continuing trend in increased disc surface smoothness, the configuration of the burnishing head has undergone significant developmental changes, and, with the extremely smooth discs associated with current and future technology disc drives, several engineering challenges have arisen.

Firstly, maximum allowable disc surface roughness is currently on the order of 0.8 μ" (0.8 microinch), and the requirement of disc drives currently under development will reduce this maximum allowable disc surface roughness to 0.5 μ" or less. Thus, the burnishing heads used to process the discs must fly and operate at such reduced heights above the disc surface.

Secondly, the sub-microinch particles generated by the burnishing process must not accumulate on the burnishing pads of the burnishing head, and will preferably be expelled from beneath the burnishing head and swept off the disc surface by the centripetal force of the rotating disc.

Finally, the tribological relationship between the burnishing head and the disc must allow for a sufficient operational life for the burnishing head to be economically feasible.

The burnishing head of the present invention provides for these needs.

SUMMARY OF THE INVENTION

The present invention is a burnishing head configured to provide extremely close control of the burnishing height, to aerodynamically eject particles generated by the burnishing process from beneath the burnishing head onto the disc surface, whence they can be swept from the disc by centripetal force, and to optimize the tribological relationship between the burnishing head and a disc being burnished. The burnishing head includes a plurality of burnishing pads arranged in a substantially elliptical pattern, with the actual burnishing surface of the burnishing pads being either ion milled to provide a closely controlled surface texture, or lapped to an extremely smooth surface. The shape of the individual burnishing pads is also formed by the process of ion milling, and is either elliptical or, preferably, an aerodynamic teardrop shape, which acts to aerodynamically displace generated particles from beneath the burnishing head. The burnishing surface of the burnishing pads is coated with a diamond-like carbon coating to improve the tribological relationship between the burnishing head and the disc.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
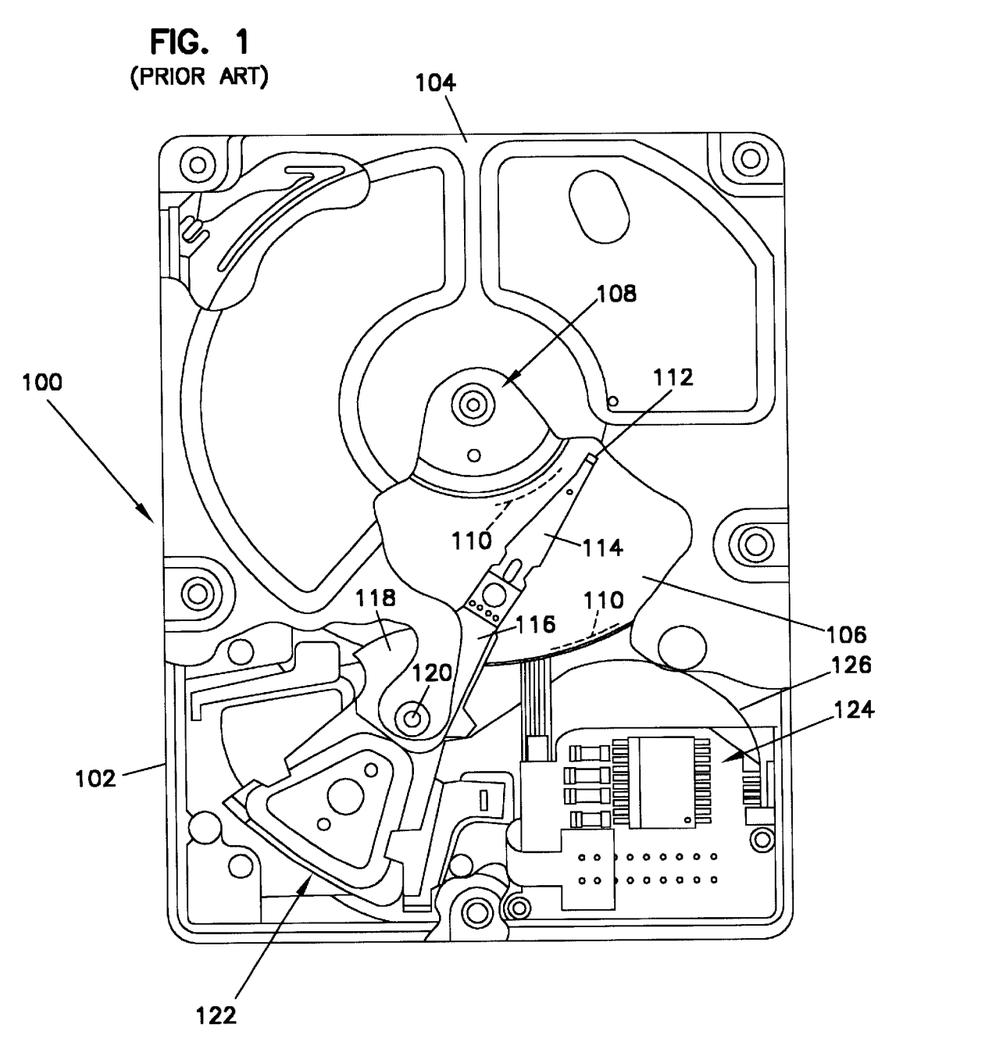
FIG. 1 is a plan view of a disc drive in which discs, which have been processed using the burnishing head of the present invention, are utilized.

Turning now to the drawings and specifically to FIG. 1, shown is a plan view of a disc drive 100 within which discs processed using the present invention are particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part on the existence of a controlled, precise relationship between the head assemblies 112 and the discs 106. Therefore, it is common in the industry to test each of the discs 106 included in the disc drive 100 before the discs 106 are assembled into the disc drive 100.

Figure 2:
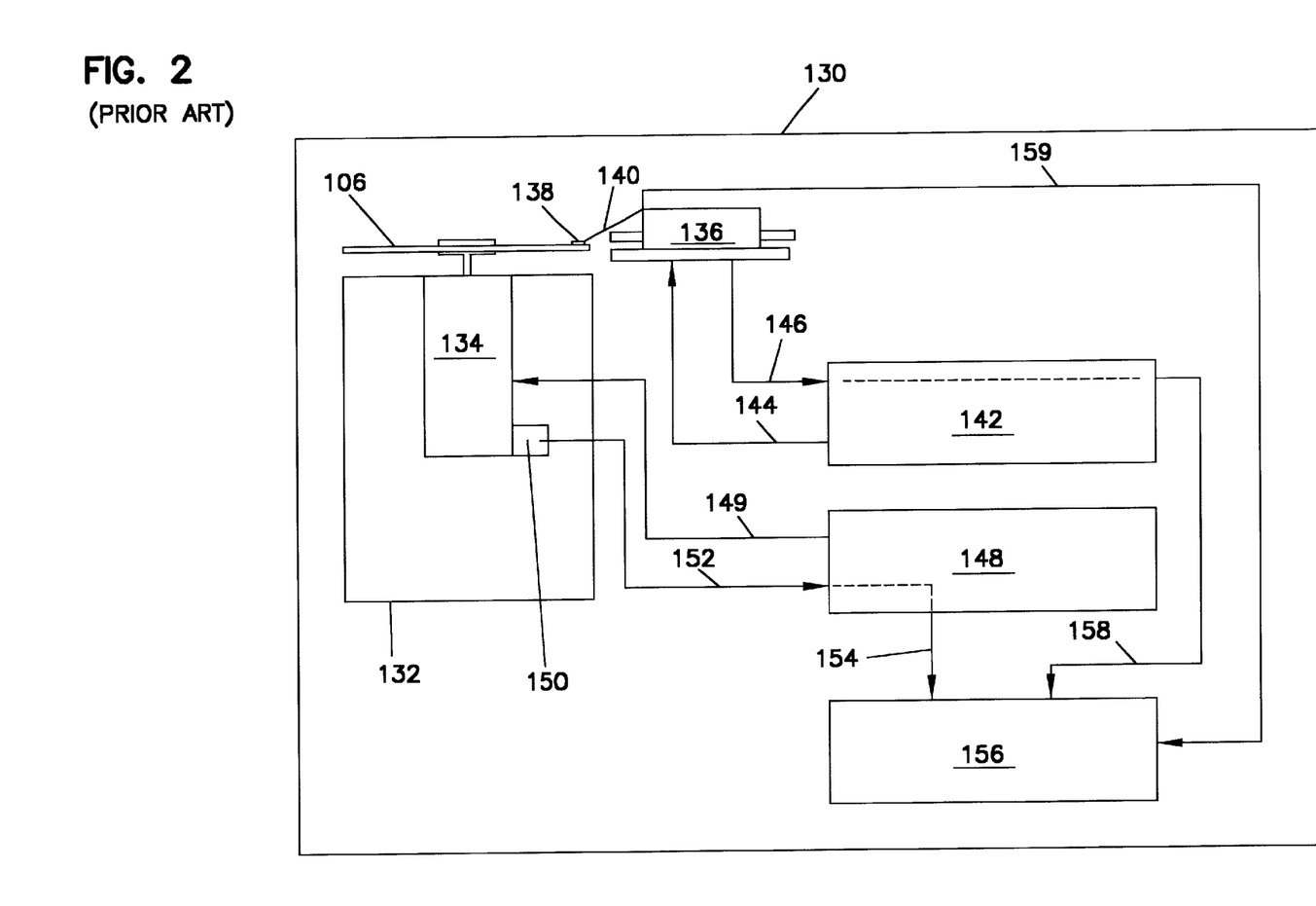
FIG. 2 is a simplified functional block diagram of a prior art test system in which the burnishing head of the present invention can be integrated.

FIG. 2 is a simplified functional block diagram of a typical prior art test unit 130 used to test and map the surface of recording discs as components before the discs are assembled into disc drive units. The test unit 130 can also incorporate the burnishing head of the present invention, should the burnishing process be required as a result of the glide test. The test unit 130 includes a precision spin stand 132 which further includes a spin motor 134 on which the disc 106 is mounted for rotation and testing.

The test unit 130 also typically includes a linear actuator 136 which is used to controllably move a test head 138, or a burnishing head, mounted on a head suspension 140, on a linear path across a radius of the disc 106. Actuator control logic 142 is also included in the test unit 130 and provides the control signals on signal path 144 needed to move the test head 138 and monitors, via signal path 146, the position of the test or burnishing head 138 during testing or burnishing of the disc 106. In a typical test unit of the current art, the actuator supports and controls a second test or burnishing head for simultaneous testing or burnishing of the second disc surface. For purposes of clarity, the figure shows only a single test or burnishing head 138.

The test unit 130 also includes spin motor control logic 148 which is used to accelerate the spin motor 134 to its intended testing or burnishing speed by passing motor drive signals on path 149. It is common practice in the industry, during glide testing, to vary the speed of the spin motor 134 as the test head 138 is moved across the disc radius to provide a constant linear velocity between the test head 138 and the area of the disc being tested. That is, as the test head 138 is moved inward, the speed of the spin motor is increased proportionally to maintain a constant linear velocity, and thus maintain a constant flying height for the test head 138.

The spin stand 132 also includes a spin motor position encoder 150 which provides a position dependent reference signal. This reference signal is carried over signal path 152 to the spin motor control logic 148 where it is used to assist in the control of the speed of the spin motor 134. The reference signal is also passed via signal path 154 to defect mapping logic 156, where it is utilized, along with the actuator position signal passed via signal path 158 by the actuator control logic 142, to maintain a constant calculation of the radial and circumferential portion of the disc 106 that is located under the test head 138.

During the testing operation, a disc 106 is mounted on the spin motor 134 and the spin motor 134 is brought up to operational speed by the spin motor control logic 148. Once the spin motor 134 is at the proper speed, the actuator control logic 142 causes the actuator 136 to move the test head 138 into cooperative arrangement with the surface of the disc 106. The test head 138 is then stepped across the spinning disc 106 at a rate selected to cause the test head 138 to pass over every portion of the disc surface. As the head is stepped across the disc surface, the spin motor control logic 148 varies the spin motor speed to maintain a constant relative linear velocity between the test head 138 and the disc area being tested as noted above.

A defect on the disc surface will cause the test head 138 to generate a defect signal which is passed to the defect mapping logic 156 via signal path 159. Recognition of the defect signal by the defect mapping logic 156 results in the current radial and circumferential location of the test head 138 relative to the disc 106 being recorded. Once the test head 138 has passed over the entire usable radial extent of the disc 106, all detected and recorded defects are correlated to produce a defect map of the entire disc surface.

If the glide testing described above indicates that burnishing of the disc under test is advisable, the disc is typically moved to a similar test system which includes a burnishing head. The burnishing head is moved radially across the entire usable portion of the disc in a manner similar to that described above to mechanically remove any surface defects which would be expected to adversely effect the operation of the disc drive into which the disc will eventually be incorporated.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

Prior art burnishing heads typically used miniature grind-wheels to produce the burnishing surface texture. Such processes, however, were limited in the precision of surface texture produced as well as in the achievable geometries. That is, the size of individual surface features was dependent on the minimum size of the grind-wheel used, and the geometries produced were limited to "straight-line" patterns, such as "waffle" and "diamond" shapes.

Furthermore, the grinding process produced microscopic particulate contamination that was difficult to remove from the finished burnishing head, and which could lead to damage to the discs being burnished.

Figure 3:
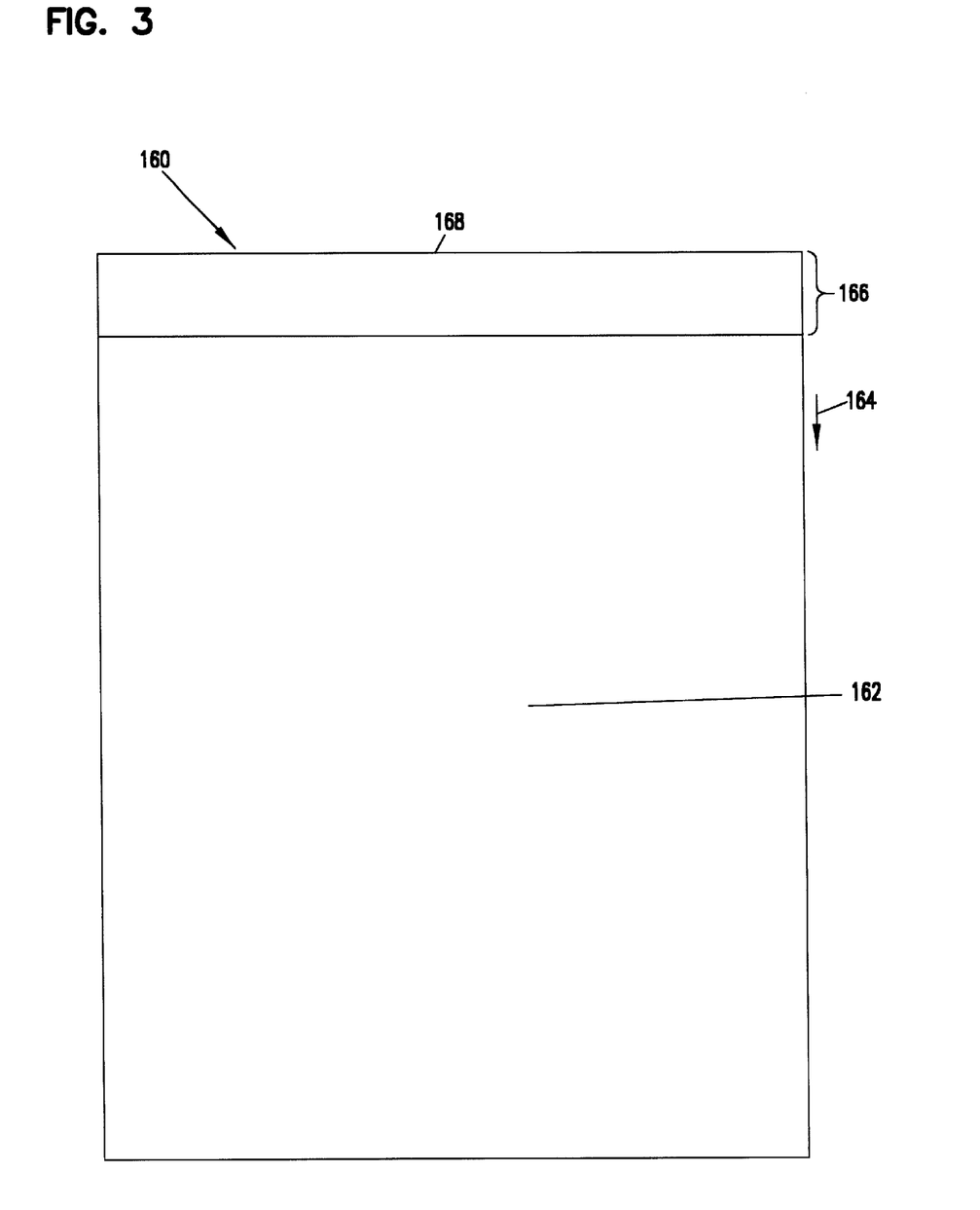
FIG. 3 is a plan view of a prepared slider body which forms the basis for all disclosed embodiments of the invention.

FIG. 3 is a plan view of a slider body 160 which is the basis for all disclosed embodiments of the present invention. FIG. 3 shows the side of the slider body 160 which, in the finished burnishing head, will face the disc during the burnishing process.

The slider body of FIG. 3 is preferably of the type known in the industry as a "series 50" slider, having a length—corresponding to the vertical dimension of FIG. 3—of_$\mu$" and a width—corresponding to the horizontal dimension of FIG. 3—of_$\mu$".

The slider body 160 includes an air bearing surface 162 which interacts with a thin layer of air dragged along by the spinning disc to fly the slider at a closely controlled height above the disc surface. The air bearing surface is manufactured to be extremely flat, and is precision lapped to have an average surface roughness ($R_a$) of typically 1–1.5 nm (1–1.5 nanometers).

The direction of disc rotation relative to the slider body 160 is shown by arrow 164, and the region 166 near the leading edge 168 is beveled out of plane from the air bearing surface in a manner well known in the industry to encourage the establishment of the air bearing between the slider body 160 and the rotating disc.

It is known in the industry that, at the microscopic levels involved in surface treatment of heads and discs, static friction, or stiction, is inversely proportional to surface roughness. That is, slight increases in surface roughness lead to reduction in the stiction between a head and a disc.

Figure 4:
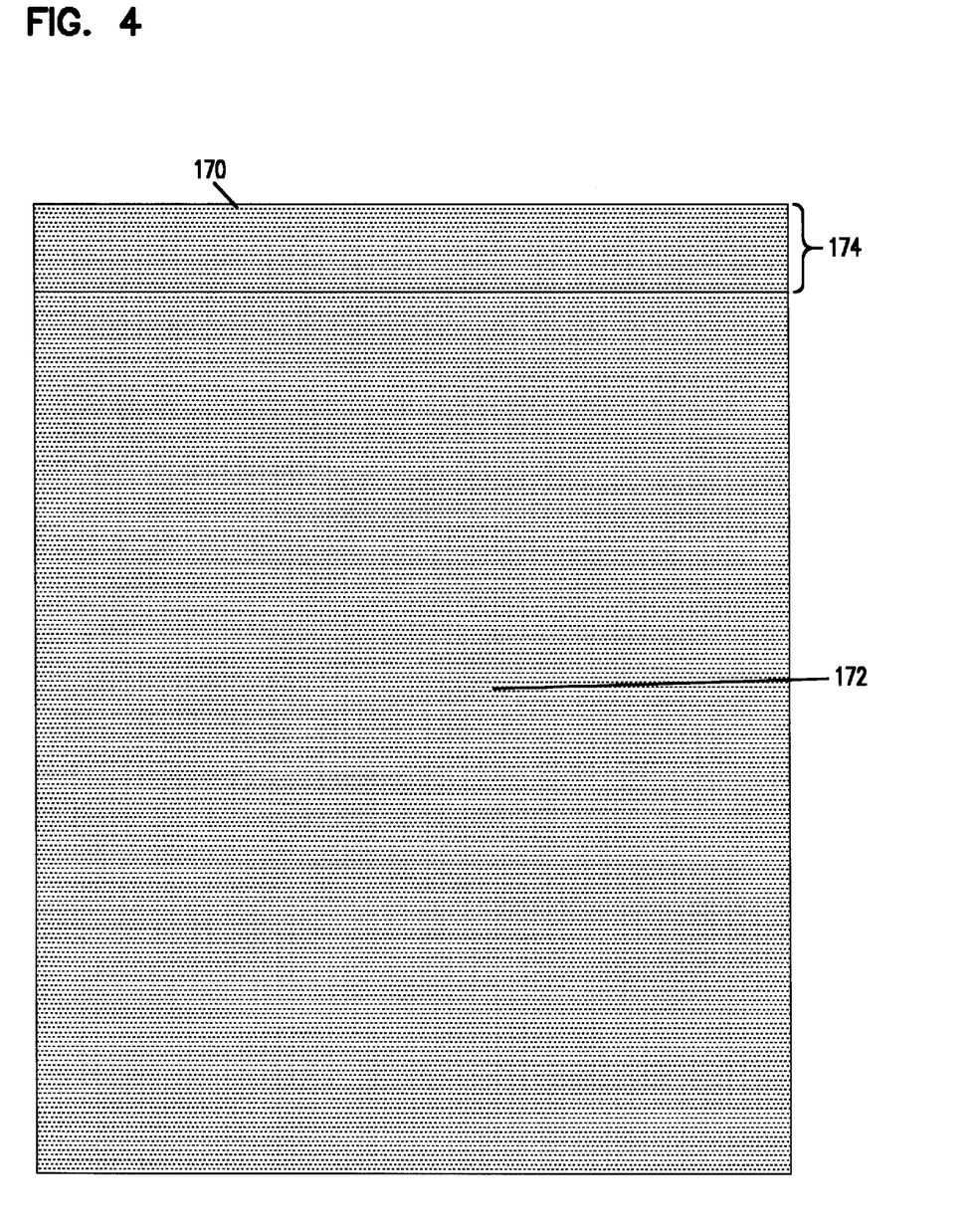
FIG. 4 is a plan view of a slider body, such as that of FIG. 3, which includes a micro-textured surface which is incorporated in certain embodiments of the present invention.

FIG. 4 is a plan view of a slider body 170, such as that of FIG. 3, which includes a micro-textured surface which is incorporated in certain embodiments of the present invention. In a first aspect of the invention, the entire air bearing surface (ABS) 172 of the slider body 170 being formed into the burnishing head of certain embodiments of the present invention, including the beveled region 174 near the slider leading edge, is micro-textured using a photo mask process and ion milling. The resultant surface texture is a cloth-like pattern with average feature-to-feature pitch of 5 $\mu$m (5 micrometers), and an average etch depth of 3 $\mu$m. This texture makes direct contact with the disc surface, and produces a finer finish than the surfaces of prior art burnishing heads In experiments conducted during the development of the invention, a micro-textured hone, using the same surface pattern as the invention, demonstrated an average surface roughness of less than 10 angstroms ($R_a$<10 Å) when used to smooth large alumina features created by an alumina backfill process.

Thus, in those embodiments of the invention described below which incorporate the micro-textured surface on the burnishing pads of the burnishing head, the micro-texture provides precise control of the resultant disc surface condition.

Once the entire ABS of the slider in process has been micro-textured using the photo mask/ion milling process, the slider undergoes a second masking and ion-milling process to produce the actual burnishing pads, and differentiate them from the resultant air bearing surface.

Figure 5:
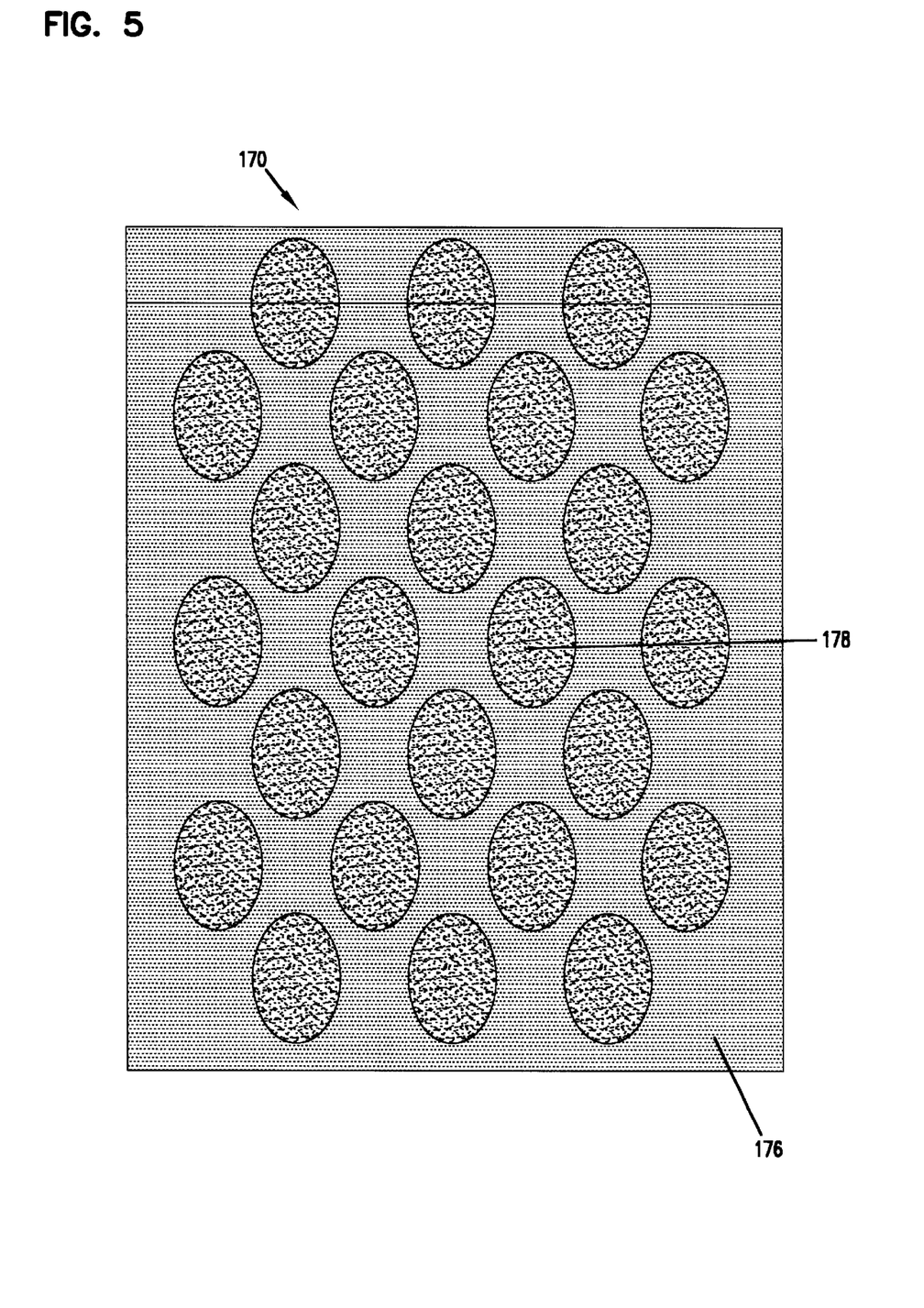
FIG. 5 is a plan view of a micro-textured slider body, such as that of FIG. 4, which includes a photolithographic mask, and illustrates an interim stage of manufacture for a first embodiment of the present invention.

FIG. 5 is a plan view of a micro-textured slider body 170, such as that of FIG. 4, which includes a photolithographic mask, and illustrates an interim stage of manufacture for a first embodiment of the present invention. Again, the ion milling process allows for the creation of more intricate burnishing pad geometries than does the prior art grind-wheel process.

Specifically, FIG. 5 shows that the micro-textured surface 176 of the slider body 170 has been selectively coated, using a photolithographic process, with a plurality of elliptical-shaped masked areas 178. It will be noted from FIG. 5 that the elliptical-shaped masked areas are arrayed in a substantially elliptical shape. That is, alternating horizontal rows of masked areas include three or four masked areas across the width of the slider body 170, providing staggered columns of masked areas. The first and final rows of masked areas are composed of three masked areas, providing the overall elliptical shape for the total array. Such a pattern minimizes "edge-effects" on the slider, and reduces the potential for damage to the disc surface being burnished.

In the next step of the manufacturing process, the slider body is again subjected to ion milling, during which the unmasked areas 176 surrounding the masked areas are displaced from the masked areas. In a presently preferred embodiment, this ion milling operation elevates the masked areas by substantially 14 $\mu$m from the surrounding areas.

At the completion of the ion milling process, the masking material is removed, once again exposing the micro-textured surface beneath the masking material.

Figure 6:
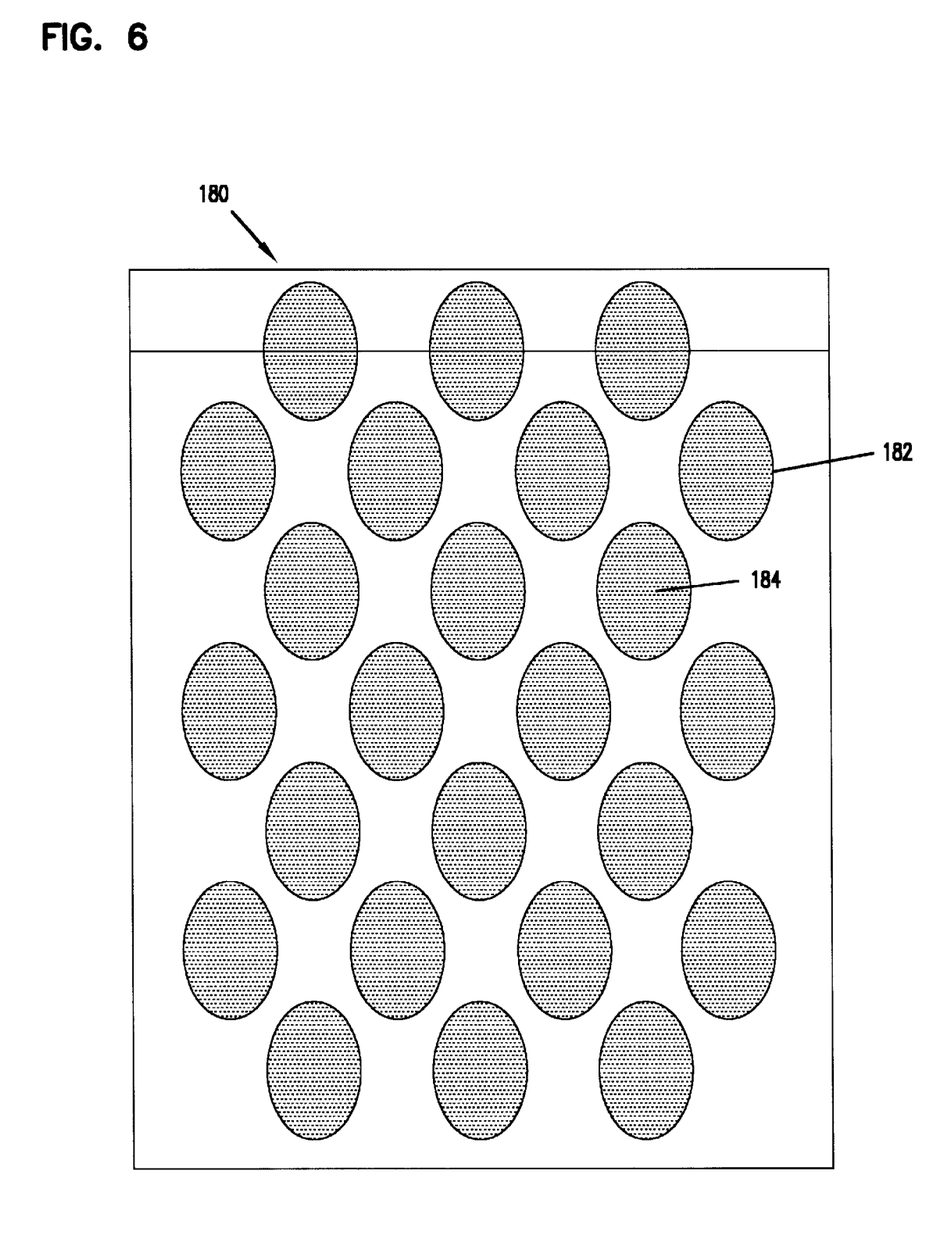
FIG. 6 is a plan view of burnishing head made in accordance with a first embodiment of the present invention.

FIG. 6 shows the finished burnishing head 180 of the first embodiment of the present invention, after the masking material has been removed. The burnishing head 180 can be seen to include a plurality of elliptical burnishing pads 182 arranged in an array of substantially elliptical shape, with the contact surface 184 of each of the burnishing pads including the micro-texture of the original slider body (170 in FIG. 4).

In a final aspect of this embodiment of the present invention, the contact surface 184, with its previously established micro-texture, is overcoated with a layer of diamond-like carbon (DLC). This DLC overcoat provides an inert surface which reduces debris collection at the contact surface 184, and which also acts to minimize stiction between the burnishing head and the disc surface.

In partial summary, the process used to fabricate the burnishing head of the first embodiment of the present invention includes the steps of: 1) beginning with a slider having an air bearing surface having $R_a$=1.0–1.5 nm, providing a micro-texture over the entire air bearing surface using photolithographic masking and ion milling; 2) applying a second photolithographic mask to define the shape and location of the elliptical-shaped burnishing pads; 3) ion milling the non-masked portions of the air bearing surface to elevate the burnishing pads above the air bearing surfaces; and 4) overcoating the contact surfaces of the burnishing pads with a DLC overcoat.

While the elliptical-shaped burnishing pads 182 of the first embodiment described hereinabove provide improved functionality over burnishing pads produced by the prior art grind-wheel process, experimentation and the flexibility of the photolithographic masking and ion milling processes have lead to a second presently preferred shape for the individual burnishing pads.

Figure 7:
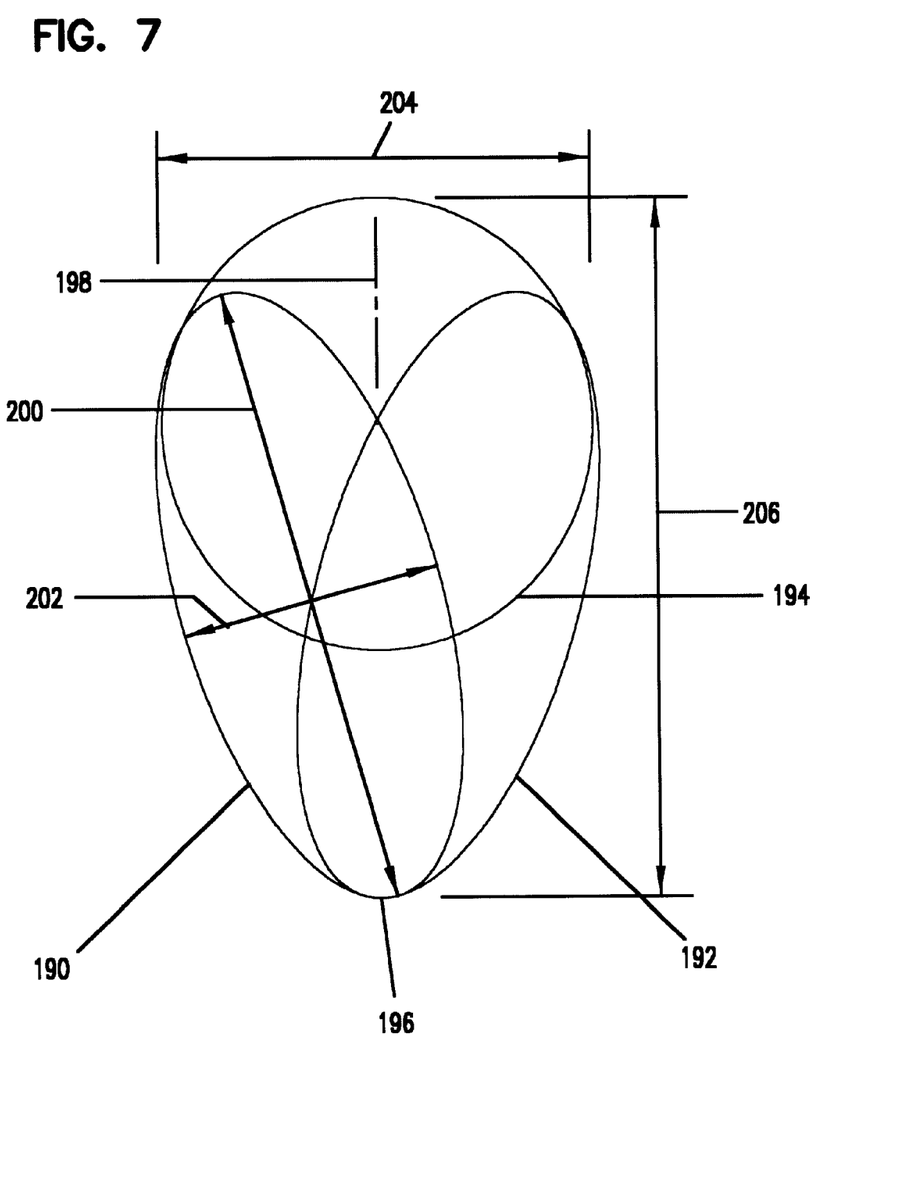
FIG. 7 is a geometrical representation of the manner in which the burnishing pads of other, presently preferred, embodiments of the present invention are formed.

FIG. 7 is a simple geometric drawing, showing how the presently preferred shape of the burnishing pads on the burnishing head of the present invention is defined.

In FIG. 7, the overall shape of the burnishing pad can be seen to be a "teardrop", and the teardrop shape is defined by a pair of ellipses 190, 192 and a superimposed circle 194. The ellipses 190, 192 overlap at their common lower ends 196 and are symmetrically tilted from the central longitudinal axis 198 of the overall shape.

In the presently preferred embodiment, each of the ellipses 190, 192 has a major axis 200 of 275 $\mu$m and a minor axis 202 of 120 $\mu$m. The amount of symmetrical tilt between the ellipses 190, 192 is selected such that the diameter of the circle 194, and the overall width 204 of the burnishing pad, is 200 $\mu$m, and the overall length 206 of the burnishing pad is 300 $\mu$m.

Again, it should be noted that this complex geometry, while readily achievable using photo-masking and ion milling, would not be possible using the prior art grind-wheel process.

The teardrop shape as defined in FIG. 7 has several advantages over the more rectilinear prior art burnishing pads: 1) the rounded edges of the teardrop shape are less prone to chip and leave debris on the disc surface than are the linear shapes achievable using the prior art grind-wheel processes; 2) the teardrop shape is also less likely to pick up and redistribute debris on the disc surface; and 3) the aerodynamic teardrop shape of the burnishing pads allows more laminar air flow around the burnishing pads, and hence less interaction between dislodged particulate contamination and the media surface and the burnishing head itself.

The teardrop shape defined in FIG. 7 is incorporated into the second and third disclosed embodiments of the present invention, as will be discussed in more detail below.

Figure 8:
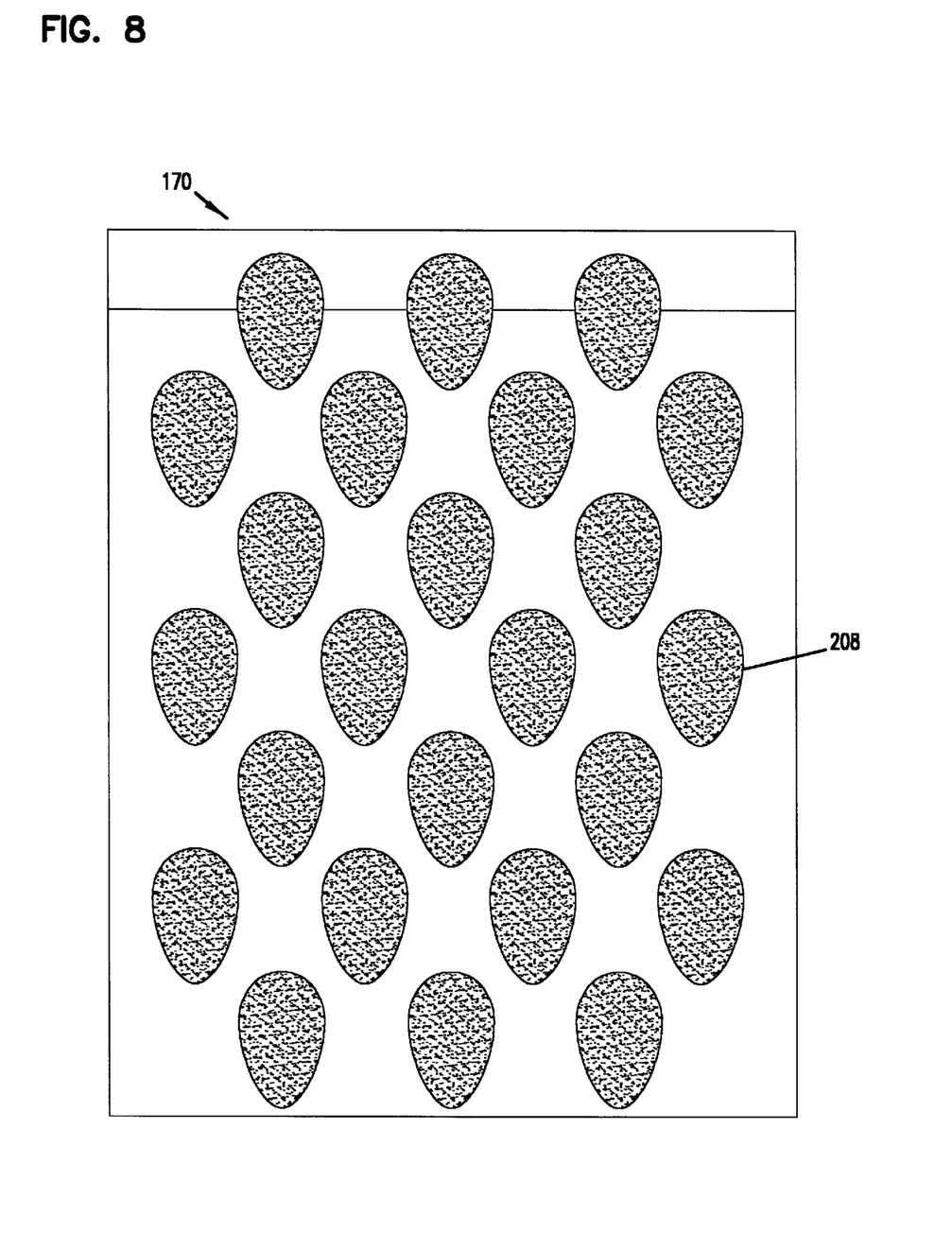
FIG. 8 is a plan view of a slider body, such as that of FIG. 3, which includes a photolithographic mask, and illustrates an interim stage of manufacture for a second embodiment of the present invention.

FIG. 8 is a plan view of a slider body 170, such as that of FIG. 3, which includes a photolithographic mask, and illustrates an interim stage of manufacture for a second embodiment of the present invention.

In this second embodiment, burnishing pads are defined by application of a photolithographic mask 208 which is applied in the teardrop shape defined by the geometry of FIG. 7, to form a substantially elliptical array, similar to that defined in FIG. 5 for the first embodiment discussed hereinabove. Again, it should be noted that such a pattern minimizes "edge-effects" on the slider, and reduces the potential for damage to the disc surface being burnished.

Since the masking material is applied to a smooth, un-micro-textured slider body 170, the subsequent ion milling operation will produce an array of burnishing pads, extending from the surrounding air bearing surface, which also have the same surface characteristics as the unmilled original air bearing surface. That is, the burnishing pads produced will have contact surfaces with an average surface roughness, $R_a$, of substantially 1.0–1.5 nm. This resultant structure is shown in FIG. 9.

Figure 9:
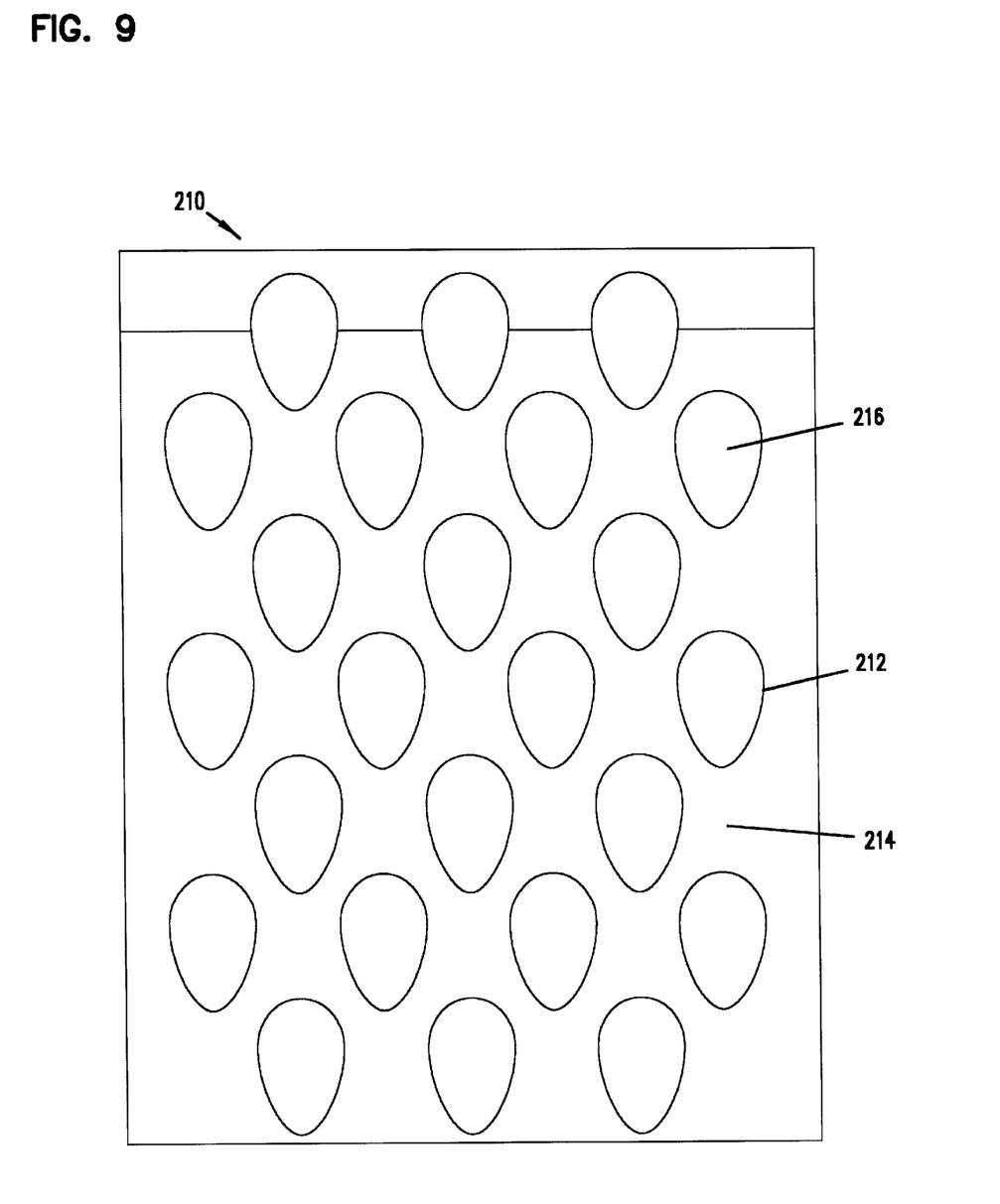
FIG. 9 is a plan view of burnishing head made in accordance with the second embodiment of the present invention.

FIG. 9 is a plan view of a completed burnishing head 210 made in accordance with the second embodiment of the present invention. After the ion milling process is completed, the masking material, 208 in FIG. 8, is stripped away, leaving a plurality of burnishing pads 212 extending from the air bearing surface 214 of the burnishing head.

A final manufacturing step, to provide an inert contact surface and improve the tribological relationship between the burnishing head 210 and the disc being processed, would be to provide a DLC coating on the contact surfaces 216 of the individual burnishing pads 212.

In partial summary, the process used to fabricate the burnishing head of the second embodiment of the present invention includes the steps of: 1) beginning with a slider having an air bearing surface with $R_a$ of 1.0–1.5 nm, applying a photolithographic mask to define the shape and location of the teardrop shaped burnishing pads; 3) ion milling the non-masked portions of the air bearing surface to elevate the burnishing pads above the air bearing surfaces; and 4) overcoating the contact surfaces of the burnishing pads with a DLC overcoat.

While the teardrop shape of the burnishing pads of the second embodiment serves to provide improved laminar air flow around the individual burnishing pads and more efficient movement of generated particles from under the burnishing head, perhaps the optimum embodiment of the present invention is found in a combination of the first and second embodiments already discussed. The third, and presently preferred, embodiment includes the micro-texturing of the first embodiment with the teardrop shaped burnishing pads of the second embodiment.

Figure 10:
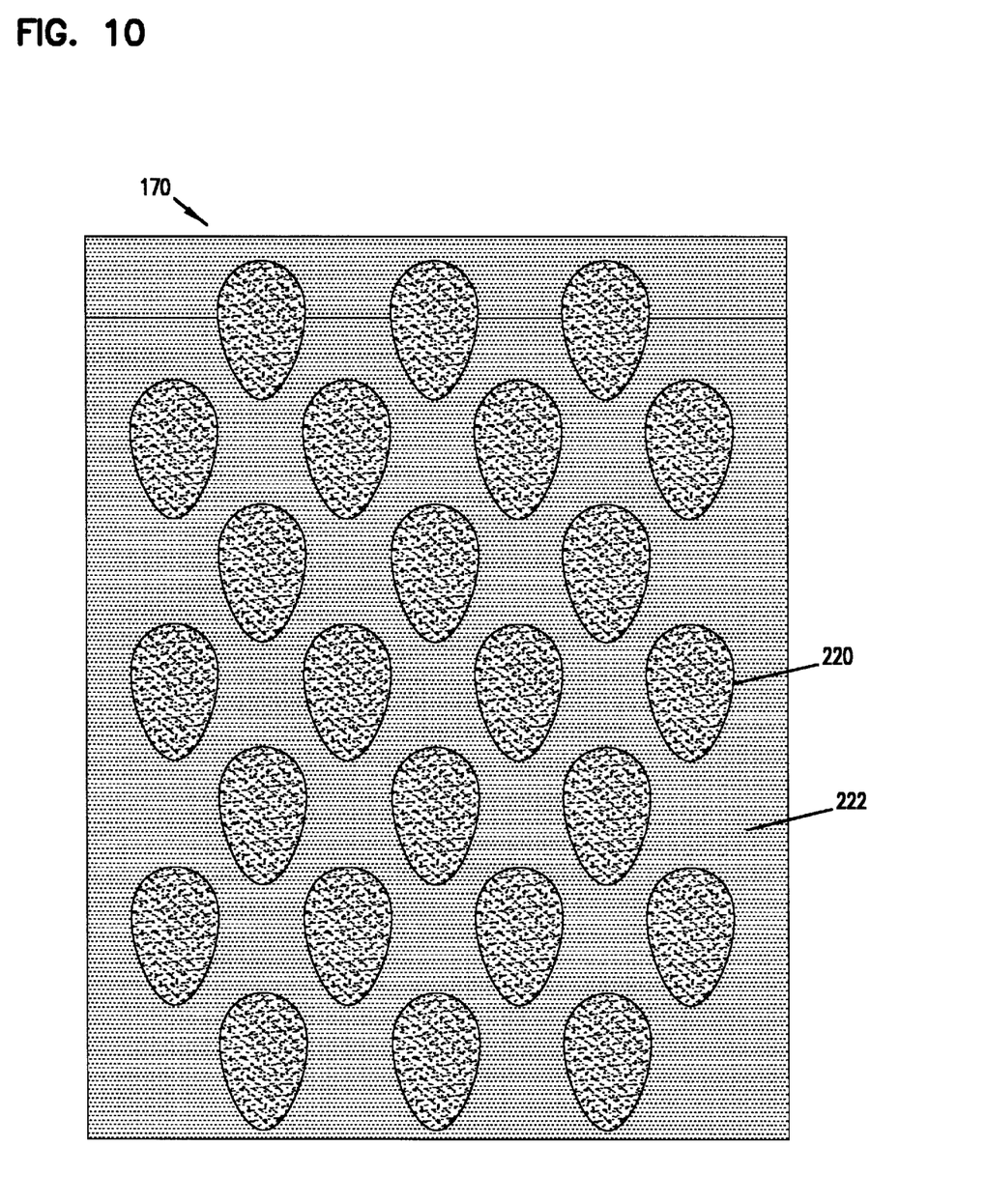
FIG. 10 is a plan view of a micro-textured slider body, such as that of FIG. 4, which includes a photolithographic mask, and illustrates an interim stage of manufacture for a third embodiment of the present invention.

FIG. 10 is a plan view of a micro-textured slider body 170, such as that of FIG. 4, which includes a photolithographic mask 220, similar to the mask pattern 208 of FIG. 8, and illustrates an interim stage of manufacture for the third embodiment of the present invention.

The photolithographic mask 220 is applied in the same pattern and geometry as the mask 208 of FIG. 8, and will result in burnishing pads shaped and positioned similarly to the second embodiment. The difference between FIG. 10 and FIG. 8 is that the slider body 170 has already undergone a first masking and ion milling operation to micro-texture the entire air bearing surface 222.

After the second photolithographic masking operation illustrated in FIG. 10 is performed, those areas outside the photo mask 220 are then ion milled, again to a depth of about 14 $\mu$m, elevating the burnishing pads above the surrounding ion milled air bearing surface 222.

Figure 11:
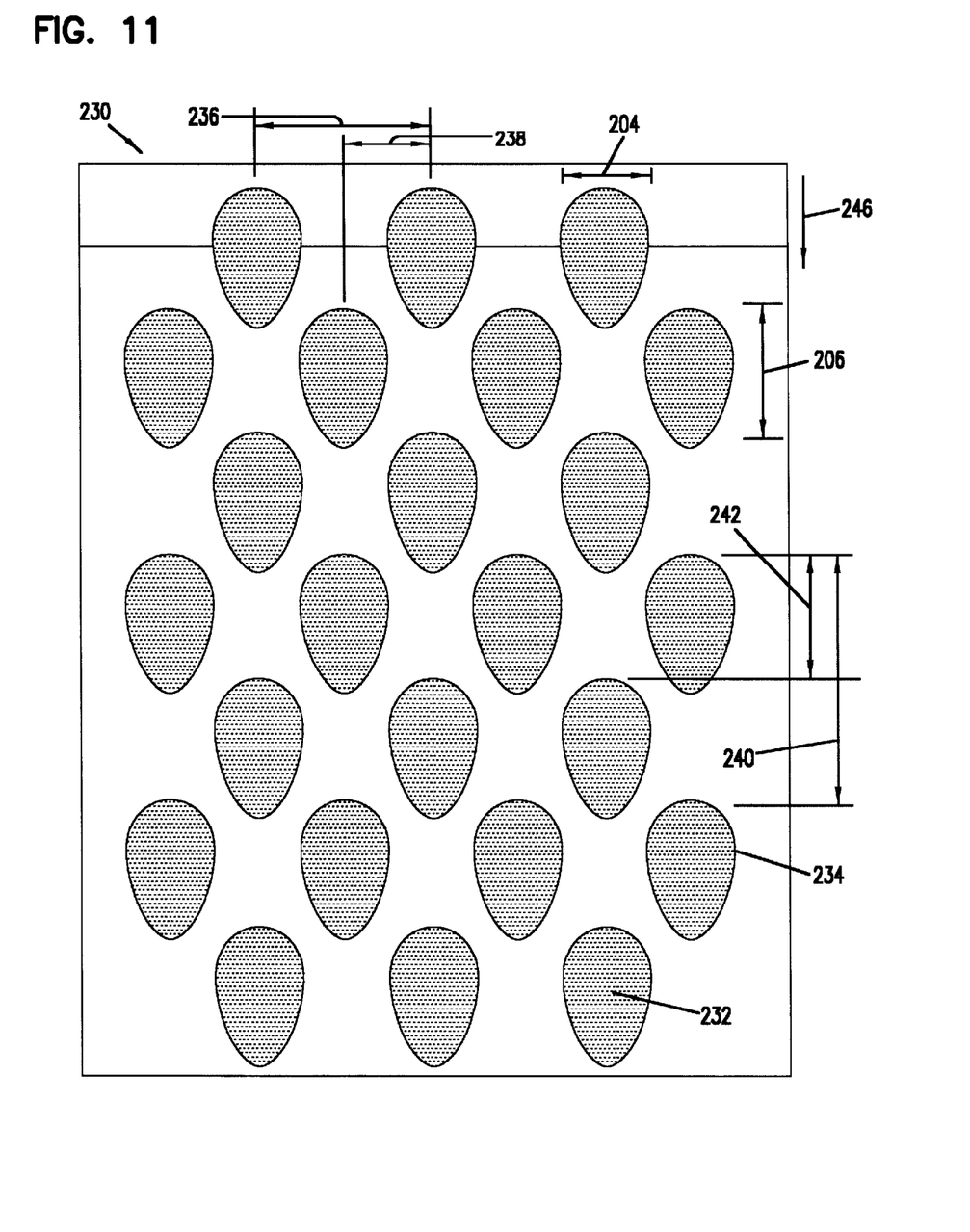
FIG. 11 is a plan view of a burnishing head made in accordance with the third embodiment of the present invention.

FIG. 11 is a plan view of a finished burnishing head 230 made in accordance with the third embodiment of the present invention. In FIG. 11, the masking material, 220 in FIG. 10, has been removed, exposing the previously micro-textured surface which is now the contact surface 232 of each of the burnishing pads 234.

As can be seen in the figure, the burnishing pads 234 are arrayed in alternating, staggered rows with three or four pads in each row. It will be recalled from the discussion of FIG. 7 above that each individual burnishing pad 234 has an overall width 204, in the currently preferred embodiment, of 200 $\mu$m, and an overall length 206 of 300 $\mu$m. The presently preferred arrangement of burnishing pads 234 envisions that there will be a lateral separation 236 between burnishing pads in the same row of 410 $\mu$m, and a lateral separation 238 between each burnishing pad 234 and the immediately adjacent burnishing pad 234 in adjacent rows of 205 $\mu$m.

Similarly, the presently preferred embodiment envisions that, along the length of the burnishing head 230, adjacent burnishing pads in the same column will have a longitudinal separation 240 of 520 $\mu$m, while immediately adjacent burnishing pads in adjacent columns will have a longitudinal separation 242 of 260 $\mu$m.

In FIG. 11, the direction of disc rotation relative to the burnishing head 230 is again shown by arrow 246. One of skill in the art will appreciate that the aerodynamic teardrop shape of the burnishing pads 234 will result in reduction of turbulent air pockets downstream of the burnishing pads 234, thus reducing the possibility that debris generated by the burnishing process will be directed either into the disc surface, or into the channels between the burnishing pads causing contamination buildup. Instead, the aerodynamic character of the teardrop shape will serve to cause any generated particulate contaminants to be swept from beneath the burnishing head 230 out onto the disc surface, and the centripetal force of the spinning disc will act to move any such particles outward off the disc surface.

Once again, it is envisioned by the present invention that the contact surface 232 will, in a final manufacturing step, be layered with a DLC coating, to provide an inert surface which reduces debris collection at the contact surface 232, and which also acts to minimize stiction between the burnishing head 230 and the disc surface.

Figure 12:
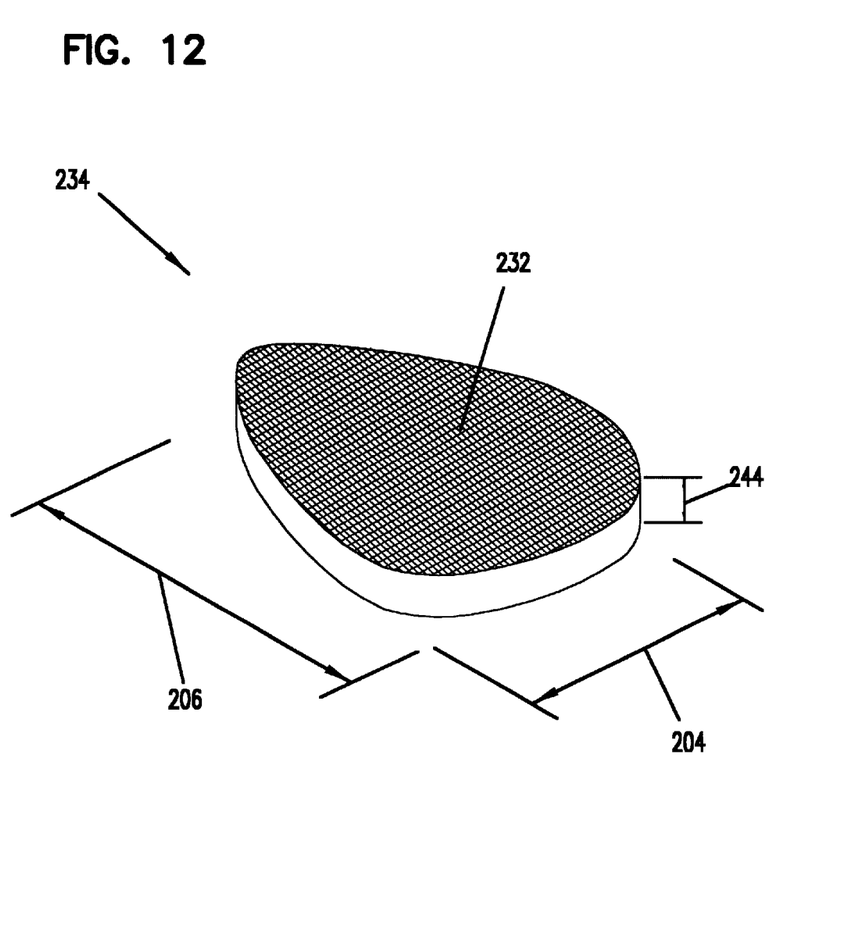
FIG. 12 is a detail perspective view of a burnishing pad which forms a portion of the burnishing head of the third embodiment of the present invention.

FIG. 12 is a detail perspective view of a single burnishing pad 234 made in accordance with the third embodiment of the present invention.

From the discussion of FIG. 7 above, it will be recalled that the burnishing pad 234 has an overall width 204 of 200 μm and an overall length 206 of 300 μm in the presently preferred embodiment. It will also be recalled from previous discussion that the ion milling process used to form the burnishing pad 234 acts to provide the burnishing pad 234 with a height 244 of 14 μm above the surrounding portions of the burnishing head.

FIG. 12 also shows the DLC-coated micro-texture on the contact surface 232 of the burnishing pad 234.

In partial summary, the process used to fabricate the burnishing head of the third embodiment of the present invention includes the steps of: 1) beginning with a slider having an air bearing surface, providing a micro-texture over the entire air bearing surface using photolithographic masking and ion milling; 2) applying a second photolithographic mask to define the shape and location of the teardrop shaped burnishing pads; 3) ion milling the non-masked portions of the air bearing surface to elevate the burnishing pads above the air bearing surfaces; and 4) overcoating the contact surfaces of the burnishing pads with a DLC overcoat.

From the foregoing, it is apparent that the present invention is particularly well suited to provide the benefits set forth hereinabove as well as others inherent therein. While particular embodiments of the invention have been described herein, modifications to the embodiments that fall within the envisioned scope of the invention may suggest themselves to one of skill in the art who reads this disclosure. Therefore, the scope of the invention should be considered to be limited only by the following claims.

What is claimed is:

1. A burnishing head for smoothing surface irregularities on surfaces of magnetic recording discs comprising:
    a slider body comprising an air bearing surface; and
    an array of burnishing pads extending from the air bearing surface, the array of burnishing pads being substantially elliptical in shape, each individual burnishing pad being substantially teardrop shaped with a tapered trailing portion and having a micro-textured contact surface, the micro-textured contact surface being overcoated with a diamond-like carbon overcoating.

2. A burnishing head, as claimed in claim 1, wherein the array of burnishing pads comprises alternating, staggered rows of three and four burnishing pads each, with the first and last rows comprising three burnishing pads.

3. A burnishing head, as claimed in claim 1, wherein the geometry of the substantially teardrop shaped burnishing pads is defined by a pair of ellipses, overlapping at first ends thereof, and symmetrically tilted away from a central longitudinal axis at second ends thereof, and a superimposed circle connecting the second ends of the ellipses.

4. A burnishing head, as claimed in claim 3, wherein the ellipses have major axes of substantially 275 micrometers and minor axes of substantially 120 micrometers, and wherein the superimposed circle has a diameter of substantially 200 micrometers.

5. A burnishing head, as claimed in claim 3, wherein the substantially teardrop shaped burnishing pads each have an overall width of substantially 200 micrometers and an overall length of substantially 300 micrometers.

6. A burnishing head, as claimed in claim 1, wherein the distance by which the array of burnishing pads extends beyond the air bearing surface is substantially 14 micrometers.

7. A burnishing head, as claimed in claim 1, wherein the micro-textured contact surface comprises an array of features spaced substantially 5 micrometers apart, with areas between adjacent features ion milled to a depth of substantially 3 micrometers.

8. A burnishing head, as claimed in claim 1, wherein the slider body has a leading edge, and wherein the major axis of the elliptical shape of the array of burnishing pads is substantially perpendicular to the leading edge.

9. A burnishing head, as claimed in claim 1, wherein the array of burnishing pads comprises alternating, staggered rows of n and n+1 burnishing pads each, with the first and last rows comprising n burnishing pads.

10. A burnishing head for smoothing irregularities on surfaces of magnetic recording discs comprising:
    a slider body comprising an air bearing surface; and
    an array of burnishing pads extending from the air bearing surface, the array of burnishing pads being substantially elliptical in shape, each individual burnishing pad being substantially elliptical and having a micro-textured contact surface, the micro-textured contact surface being overcoated with a diamond-like carbon overcoating.

11. A burnishing head, as claimed in claim 10, wherein the array of burnishing pads comprises alternating, staggered rows of three and four burnishing pads each, with the first and last rows comprising three burnishing pads.

12. A burnishing head, as claimed in claim 10, wherein the slider body has a leading edge, and wherein the major axis of the elliptical shape of the array of burnishing pads is substantially perpendicular to the leading edge.

13. A burnishing head, as claimed in claim 10, wherein the array of burnishing pads comprises alternating, staggered rows of n and n+1 burnishing pads each, with the first and last rows comprising n burnishing pads.

14. A burnishing head for smoothing surface irregularities on surfaces of magnetic recording discs comprising:
    a slider body comprising an air bearing surface; and
    an array of burnishing pads extending from the air bearing surface, the array of burnishing pads being substantially elliptical in shape, each individual burnishing pad being substantially teardrop shaped and having a contact surface with an average surface roughness of substantially 1.0 to 1.5 micrometers, the contact surface being overcoated with a diamond-like carbon overcoating.

15. A burnishing head, as claimed in claim 14, wherein the slider body has a leading edge, and wherein the major axis of the elliptical shape of the array of burnishing pads is substantially perpendicular to the leading edge.

16. A burnishing head, as claimed in claim 14, wherein the array of burnishing pads comprises alternating, staggered rows of n and n+1 burnishing pads each, with the first and last rows comprising n burnishing pads.

17. A burnishing head for smoothing surface irregularities on surfaces of magnetic recording discs comprising:
    a slider body comprising an air bearing surface and a leading edge; and
    an array of burnishing pads extending from the air bearing surface, the array of burnishing pads being arranged in a substantially elliptical shape, the major axis of the elliptical shape of the array of burnishing pads being substantially perpendicular to the leading edge.

18. A burnishing head as claimed in claim 17, wherein the array of burnishing pads comprises alternating, staggered rows of n and n+1 burnishing pads each, with the first and last rows comprising n burnishing pads.

19. A burnishing head, as claimed in claim 18, wherein n is equal to three.

20. A burnishing head, as claimed in claim 17, wherein each individual burnishing pad is substantially elliptical.

21. A burnishing head, as claimed in claim 17, wherein each individual burnishing pad is substantially teardrop shaped with a tapered trailing portion.

22. A burnishing head, as claimed in claim 17, wherein each individual burnishing pad comprises a micro-textured contact surface.

23. A burnishing head, as claimed in claim 22, wherein the micro-textured contact surface is overcoated with a diamond-like carbon overcoating.

24. Apparatus, comprising:
- a slider body supportable over a surface of a magnetic recording disc, the slider body comprising an air bearing surface and a leading edge; and
- means, coupled to the slider body, for burnishing surface irregularities on the disc surface and for reducing edge effects on the slider body as the slider body is supported over the disc surface.

25. A burnishing head for smoothing surface irregularities on surfaces of magnetic recording discs comprising:
- a slider body comprising an air bearing surface;
- an array of burnishing pads extending from the air bearing surface, the array of burnishing pads being substantially elliptical in shape, each individual burnishing pad being substantially teardrop shaped with a tapered trailing portion and having a micro-textured contact surface, the micro-textured contact surface being overcoated with a diamond-like carbon overcoating wherein the geometry of the substantially teardrop shaped burnishing pads is defined by a pair of ellipses, overlapping at first ends thereof, and symmetrically tilted away from a central longitudinal axis at second ends thereof, and a superimposed circle connecting the second ends of the ellipses.

26. A burnishing head, as claimed in claim 25, wherein the ellipses have major axes of substantially 275 micrometers and minor axes of substantially 120 micrometers, and wherein the superimposed circle has a diameter of substantially 200 micrometers.

27. A burnishing head, as claimed in claim 25, wherein the substantially teardrop shaped burnishing pads each have an overall width of substantially 200 micrometers and an overall length of substantially 300 micrometers.

28. A burnishing head for smoothing surface irregularities on surfaces of magnetic recording discs comprising:
- a slider body comprising an air bearing surface;
- an array of burnishing pads extending from the air bearing surface, the array of burnishing pads being substantially elliptical in shape, each individual burnishing pad being substantially teardrop shaped with a tapered trailing portion and having a micro-textured contact surface, the micro-textured contact surface being overcoated with a diamond-like carbon overcoating wherein the micro-textured contact surface comprises an array of features spaced substantially 5 micrometers apart, with areas between adjacent features ion milled to a depth of substantially 3 micrometers.

29. A burnishing head for smoothing surface irregularities on surfaces of magnetic recording discs comprising:
- a slider body comprising an air bearing surface;
- an array of burnishing pads extending from the air bearing surface, the array of burnishing pads being substantially elliptical in shape, each individual burnishing pad being substantially teardrop shaped with a tapered trailing portion and having a micro-textured contact surface, the micro-textured contact surface being overcoated with a diamond-like carbon overcoating wherein the slider body has a leading edge, and wherein the major axis of the elliptical shape of the array of burnishing pads is substantially perpendicular to the leading edge.

30. A burnishing head for smoothing surface irregularities on surfaces of magnetic recording discs comprising:
- a slider body comprising an air bearing surface;
- an array of burnishing pads extending from the air bearing surface, the array of burnishing pads being substantially elliptical in shape, each individual burnishing pad being substantially elliptical and having a micro-textured contact surface, the micro-textured contact surface being overcoated with a diamond-like carbon overcoating;

wherein the slider body has a leading edge, and wherein the major axis of the elliptical shape of the array of burnishing pads is substantially perpendicular to the leading edge.

* * * * *